(12) United States Patent
Suematsu et al.

(10) Patent No.: US 9,299,977 B2
(45) Date of Patent: Mar. 29, 2016

(54) MANUFACTURING METHOD OF ELECTRODE MATERIAL

(71) Applicant: NIPPON CHEMI-CON CORPORATION, Shinagawa-ku, Tokyo (JP)

(72) Inventors: Shunzo Suematsu, Tokyo (JP); Daisuke Horii, Tokyo (JP); Katsuhiko Naoi, Tokyo (JP); Wako Naoi, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days.

(21) Appl. No.: 14/354,582

(22) PCT Filed: Oct. 29, 2012

(86) PCT No.: PCT/JP2012/077906
§ 371 (c)(1),
(2) Date: Jul. 20, 2014

(87) PCT Pub. No.: WO2013/062129
PCT Pub. Date: May 2, 2013

(65) Prior Publication Data
US 2014/0363568 A1    Dec. 11, 2014

(30) Foreign Application Priority Data
Oct. 29, 2011   (JP) ................................. 2011-238057

(51) Int. Cl.
*B05D 5/12*    (2006.01)
*H01M 4/04*    (2006.01)
(Continued)

(52) U.S. Cl.
CPC ......... *H01M 4/0471* (2013.01); *C23C 18/1262* (2013.01); *H01G 11/50* (2013.01);
(Continued)

(58) Field of Classification Search
USPC .................................. 427/123; 502/101, 182
See application file for complete search history.

(56) References Cited

U.S. PATENT DOCUMENTS 7,985,388 B2 *  7/2011  Shen et al. ........................ 423/1
8,449,980 B2    5/2013  Suzuki et al.
(Continued)

FOREIGN PATENT DOCUMENTS

CN        101295787 A    10/2008
JP        2007-160151 A   6/2007
(Continued)

OTHER PUBLICATIONS

Office Action issued Nov. 4, 2015, in Chinese Patent Application No. 201280052017.0.

*Primary Examiner* — Brian K Talbot
(74) *Attorney, Agent, or Firm* — Shapiro, Gabor and Rosenberger, PLLC

(57) ABSTRACT

A method of manufacturing a composite materials in which a carbon material and a metal compound can maintain a nano-sized form as a final product is realized, and a method for manufacturing a superior electrode material is provided. A metal compound precursor is formed from a metal compound material source, and a mixture of the metal compound precursor and a carbon material is calcinated. In the treatment to form the precursor, a treatment of absorbing one of the metal compound material sources to the functional group of the carbon material and a treatment of producing on the carbon material a treatment of reacting the remaining material source of the adsorbed metal compound material source on the carbon material to produce a metal compound precursor are performed in separate steps.

7 Claims, 7 Drawing Sheets

(51) Int. Cl.

| | | |
|---|---|---|
| *C23C 18/12* | (2006.01) | |
| *H01M 4/36* | (2006.01) | |
| *H01G 11/50* | (2013.01) | |
| *H01G 11/86* | (2013.01) | |
| *H01M 4/139* | (2010.01) | |
| *H01M 4/485* | (2010.01) | |
| *H01M 4/587* | (2010.01) | |
| *H01M 4/1393* | (2010.01) | |
| *H01M 4/1395* | (2010.01) | |
| *H01M 4/62* | (2006.01) | |
| *H01G 11/24* | (2013.01) | |

(52) U.S. Cl.
CPC .......... *H01G 11/86* (2013.01); *H01M 4/0402* (2013.01); *H01M 4/139* (2013.01); *H01M 4/1393* (2013.01); *H01M 4/1395* (2013.01); *H01M 4/36* (2013.01); *H01M 4/364* (2013.01); *H01M 4/366* (2013.01); *H01M 4/485* (2013.01); *H01M 4/587* (2013.01); *H01M 4/626* (2013.01); *B05D 5/12* (2013.01); *H01G 11/24* (2013.01); *Y02E 60/122* (2013.01); *Y02E 60/13* (2013.01)

(56) References Cited

U.S. PATENT DOCUMENTS

| | | | |
|---|---|---|---|
| 2005/0260122 A1* | 11/2005 | Li et al. | 423/594.14 |
| 2009/0008244 A1 | 1/2009 | Suzuki et al. | |
| 2010/0025627 A1* | 2/2010 | Naoi et al. | 252/182.1 |
| 2012/0132861 A1 | 5/2012 | Tamamitsu et al. | |
| 2012/0183860 A1 | 7/2012 | Naoi et al. | |

FOREIGN PATENT DOCUMENTS

| | | |
|---|---|---|
| JP | 2008-270795 A | 11/2008 |
| JP | 2008-277790 A | 11/2008 |
| JP | 2009-302044 A | 12/2009 |
| JP | 2010-044951 A | 2/2010 |
| JP | 2010-212309 A | 9/2010 |
| JP | 2010-239097 A | 10/2010 |
| JP | 2011-216749 A | 10/2011 |
| WO | WO 2011/040022 A1 | 4/2011 |

* cited by examiner

Composite (Form: particulate)    Fibrous carbon (Form: Fibrous)

MANUFACTURING METHOD OF ELECTRODE MATERIAL

TECHNICAL FIELD

The present invention relates to a method for manufacturing an electrode material consisting of a composite material of electrode active material and carbon material.

BACKGROUND ART

Carbon materials etc. that store and release lithium are currently being used as electrodes for lithium batteries, though, since their redox potentials are lower than the reduction potential of the electrolytic solution, there is a possibility that the electrolytic solution will degrade. Accordingly, lithium titanate which has a redox potential higher than the reduction potential of the electrolytic solution is under consideration, but lithium titanate has a problem of low output property. Meanwhile, there is an attempt to nanosize lithium titanate to improve output property. However, reducing the carbon content in a composite material of lithium titanate nanoparticles and carbon is challenging, and improving the capacitance property was difficult.

Accordingly, a method of obtaining dispersed lithium titanate supported on carbon by applying shear stress and centrifugal force to the reactant in a rotating reactor to promote chemical reaction (generally referred to as a mechanochemical reaction) is known (see e.g. Patent Documents 1 and 2).

The object of the conventional method employing this mechanochemical reaction is to simultaneously perform the nanosizing of a carbon material, the production of a metal compound precursor, the nanosizing of the metal compound precursor, and the adsorption of the metal compound precursor onto the carbon material. However, it has been found in recent research by the present inventors that even in this conventional method, more than a little aggregation of the metal compound precursor occurs before adsorption and metal compound precursors with relatively large size are adsorbed onto the carbon material, as shown in FIG. 11.

RELATED TECHNICAL DOCUMENTS

Patent Documents

Patent Document 1: JP 2007-160151
Patent Document 2: JP 2008-270795

An electrode that uses carbon supporting lithium titanate nanoparticles described in Patent Documents 1 and exerts superior output property, however, there is recently a demand for further improving output property and improving electric conductivity in this type of electrode. In other words, there is a need to further reduce the size of the agglomerates of the metal compound capable of occluding and releasing lithium and the agglomerates of the carbon material, and thereby attempt high dispersion of the metal compound and carbon material.

The present invention is proposed to solve the problems of the conventional technology described above, the object of which is to provide a method for manufacturing an electrode material in which a carbon material and a metal compound maintain a nanosized form as a final product and exert further high output property.

SUMMARY OF THE INVENTION

In order to achieve the above objectives, the method for manufacturing an electrode material according to the present invention is a method for manufacturing an electrode material consisting of a composite material of a metal compound capable of occluding and releasing lithium supported on a carbon material, comprising a first mechanochemical treatment of dispersing a starting material for a metal compound capable of occluding and releasing lithium and a carbon material by applying shear stress and centrifugal force in a rotating reactor, a second mechanochemical treatment of further applying shear stress and centrifugal force in the reactor after the first mechanochemical treatment to allow production of the metal compound precursor from the starting material, and a calcination treatment for heating the mixture obtained by the second mechanochemical treatment.

The first mechanochemical treatment includes adsorbing one of the starting materials of the metal compound onto the carbon material, and the second mechanochemical treatment includes reacting the remaining starting materials of the adsorbed starting materials of the metal compound on the carbon material to produce the metal compound precursor on the carbon material.

In this case, a hydrolysis reaction may be included in the metal compound production process, it is desirable that the solvent is an alcohol in the first mechanochemical treatment, and water is added in the second mechanochemical treatment.

Moreover, a complex formation reaction may be included in the metal compound production process, it is desirable to add a pH adjustment treatment between the first and second mechanochemical treatments.

The electrode material may be a sheet composite of the composite material molded in a paper machine using a fibrous carbon binder, and the fibrous carbon binder of the composite material may comprise any of carbon nanotubes, carbon nanofibers, and carbon fibers having a specific surface area of less than 600 $m^2/g$.

According to the present invention, since it is possible to further reduce the size of the agglomerates of the metal compound capable of occluding and releasing lithium and the agglomerates of carbon, and moreover to prevent reaggregation thereof and thereby attempt high dispersion of the metal compound and carbon, further high input-output property can be realized.

DESCRIPTION OF EMBODIMENTS

Figure 1A:
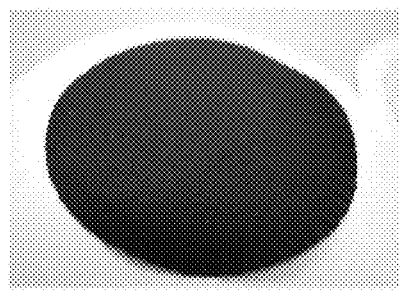
FIGS. 1A and 1B are photographs showing the state of the sheet of the Example in the first property comparison in the embodiments of the present invention.

The embodiments for carrying out the present invention will now be described below. It is noted that the present invention is not to be limited to the embodiments described below.

A composite material of a metal compound capable of occluding and releasing lithium (hereinbelow a metal compound) and a carbon material according to the present embodiment is prepared after adding a starting material for the metal compound to the carbon material and subjecting this to an Ultra-Centrifugal force processing method (hereinbelow referred to as UC treatment) which is a mechanochemical reaction. This composite material is a sheet composite with a fibrous carbon binder (hereinbelow a fibrous carbon), and may be prepared as a sheet composite by adding and stirring a fibrous carbon binder (hereinbelow a fibrous carbon) and a solvent to make a mixed solution, and then molding the mixed solution in a paper machine.

The metal compound, the carbon material, and the fibrous carbon used in the present embodiment will be described below, and the manufacturing steps of the composite material and the sheet composite will be described in detail.

The metal compound, the carbon material, and the fibrous carbon used in the present embodiment are those having the following characteristics.

(Metal Compound)

As examples of the metal compound used in the present embodiment, $Li_\alpha M_\beta Y_\gamma$ which are (a) oxide metal compounds such as $LiCoO_2$, $Li_4Ti_5O_{12}$, $SnO_2$, and $SiO$ (M=Co, Ni, Mn, Ti, Si, Sn, Al, Zn, Mg and Y=O), (b) oxysalt metal compounds such as (M=Fe, Mn, V and Y=$PO_4$, $SiO_4$, $BO_3$, $P_2O_7$), and (c) nitride metal compounds such as $Li_{2.6}Co_{0.4}N$ (M=Ni, Co, Cu and Y=N) can be used. In addition, $M_\alpha M'_\beta$ which are metals such as Si, Sn, and Ge and alloys such as $Sn_3V_2$ and $Sb_3Co$ (M=Sn, Sb, Si and M'=Fe, Co, Mn, V, Ti) can be used.

(Carbon Material)

Examples of the carbon material used in the present embodiment are carbon nanotubes (hereinbelow referred to as CNT) or carbon nanofibers (hereinbelow referred to as CNF) which have a fibrous structure, Ketjen Black (hereinbelow referred to as KB) which is carbon black having a hollow shell structure, and carbon black such as acetylene black, amorphous carbon, carbon fiber, natural graphite, artificial graphite, activated carbon, and mesoporous carbon. The carbon material is made into a composite material by mixing with a starting material for the metal compound and subjecting to UC treatment.

(Fibrous Carbon)

As the fibrous carbon binder used in the present embodiment, carbon nanotubes (hereinbelow referred to as CNT) having a fiber diameter of 1-10 nm are used. Moreover, other than CNT, carbon nanofibers (hereinbelow referred to as CNF) having a fiber diameter of 10-1000 nm as well as carbon fibers (hereinbelow referred to as CF) having a fiber diameter of greater than 1 μm, about 10 μm, and at maximum 100 μm can be used as the fibrous carbon. The fibrous carbon acts as the binder by mixing into the composite material when molding a composite material in a paper machine into a sheet. In addition, the fibrous carbon employed in the present embodiment is those having a specific surface area of less than 600 $m^2/g$.

The manufacturing steps of the sheet composite of the present embodiment will be described in detail below.

(1) Compositing Treatment of Composite Material

The composite material used in the treatment of the present embodiment is prepared by adding a starting material for the metal compound to a carbon material and subjecting to compositing by UC treatment. In addition, when the carbon material has a fibrous structure (such as CNT and CNF), ultrahigh pressure dispersion treatment may also be applied with the objective to disperse and homogenize the fibrous structure.

In other words, an example of the compositing treatment of the composite material when the carbon material has a fibrous structure is as follows:

(a) a carbon material having fibrous structure is dispersed (as ultrahigh pressure dispersion treatment), (b) a starting material for the metal compound is added to the carbon material dispersed by the ultrahigh pressure dispersion treatment to perform UC treatment which is a mechanochemical reaction (as UC treatment), and (c) the product obtained through the treatments (a) and (b) is dried and then calcinated to prepare a composite material of metal compound and carbon material.

(a) Ultrahigh Pressure Dispersion Treatment

The treatment of dispersing the carbon material having fibrous structure by an "ultrahigh pressure dispersion treatment" includes: (i) a mixing treatment; and (ii) an ultrahigh pressure dispersion treatment.

(i) Mixing Treatment

In the mixing treatment, a carbon material having fibrous structure and a solvent are mixed to produce a mixed solution. A known method can be employed as the method for mixing the carbon material and the solvent. An example includes mixing by a homogenizer. The ratio of the carbon material and the solvent is preferably 1 L of the solvent to 0.5-1 g of the carbon material.

As the solvent to be mixed with the carbon material having fibrous structure, alcohols, water, and a mixed solvent thereof can be employed. For example, isopropyl alcohol (IPA) can be used as the solvent. When IPA is used as the solvent, an advantageous effect of suppressing the aggregation of the carbon material having fibrous structure can take effect.

(ii) Ultrahigh Pressure Dispersion Treatment

In the ultrahigh pressure dispersion treatment, a known method generally referred to as jet mixing (jet flow impact mixing) is employed. In other words, a pair of nozzles is set up in a position facing each other on the inner wall of a tubular chamber, and a mixed solution of the carbon material having fibrous structure pressurized by a high-pressure pump is injected from each nozzle and allowed to collide head-on in the chamber. This allows the carbon material bundles to be crushed and enables dispersion and uniformalization. As an example, the treatment of the carbon material is performed at a pressure and concentration of 200 MPa, 3 Pass, and 0.5 g/L.

(b) UC Treatment

Figure 9:
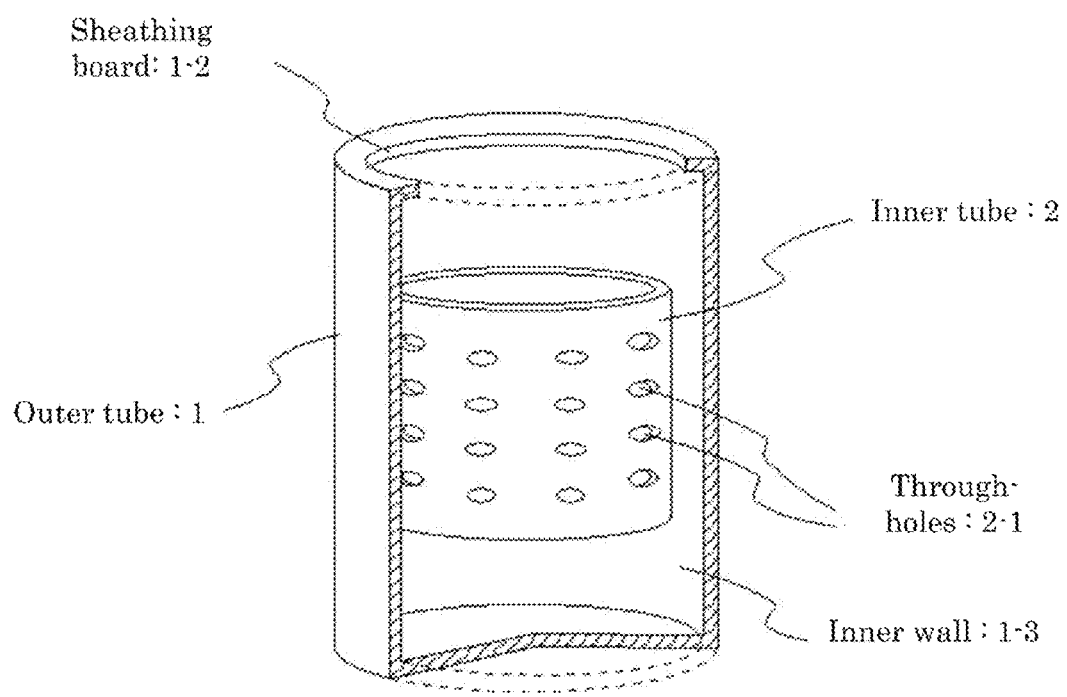
FIG. 9 is a perspective view showing an example of a reactor used in the manufacturing method of the present invention.

This can be performed with e.g. a reactor as shown in FIG. 9. As shown in FIG. 9, the reactor consists of an outer tube 1 having a sheathing board 1-2 at the opening and a rotating inner tube 2 having through-holes 2-1. By introducing the reactant inside the inner tube 2 of this reactor and rotating the inner tube 2, the reactant inside the inner tube 2 is transferred through the through-holes 2-1 of the inner tube 2 to the inner wall 1-3 of the outer tube 1 by its centrifugal force. At this time, the reactant collides with the inner wall 1-3 of the outer tube 1 due to the centrifugal force of the inner tube 2, and slides up to the upper portion of the inner wall 1-3 in a thin film state. In this state, the shear stress with the inner wall 1-3 and the centrifugal force from the inner tube 2 are both simultaneously applied to the reactant, and a large mechanical energy is thereby applied to the thin film reactant. This mechanical energy is thought to be converted into the chemical energy necessary for reaction, the so-called activation energy. As a result, the reaction proceeds in a short period of time.

In this reaction, since the mechanical energy applied to the reactant will be large when in a thin film state, the thickness of the thin film is 5 mm or less, preferably 2.5 mm or less, and further preferably 1.0 mm or less. The thickness of the thin film can be set by the width of the sheathing board and the amount of the reaction solution.

Moreover, it is thought that the reaction method of the present embodiment can be realized by the mechanical energy of shear stress and centrifugal force applied to the reactant, and this shear stress and centrifugal force are generated by the centrifugal force applied to the reactant inside the inner tube. Accordingly, the centrifugal force applied to the reactant inside the inner tube necessary for the present embodiment is 1500 N (kgms$^{-2}$) or higher, preferably 70000 N (kgms$^{-2}$) or higher, and further preferably 270000 N (kgms$^{-2}$) or higher.

The reaction method of the present embodiment above can be applied to various reactions such as a hydrolysis reaction, an oxidation reaction, a polymerization reaction, and a condensation reaction, as long as it is a liquid phase reaction.

Among these, by applying this to the production of a metal compound by a metal salt hydrolysis reaction and a condensation reaction, which were conventionally performed with a sol-gel method, uniform nanoparticles of a metal compound can be formed.

The above metal compound nanoparticles act as a favorable active material for an electrode for an electrochemical element. In other words, specific surface area will be markedly expanded and output property and capacitance property will be improved by nanosizing.

Further, in the production reaction of a metal oxide by such a metal salt hydrolysis reaction and condensation reaction, by adding a carbon material during the reaction process, a carbon material supporting highly dispersed metal compound nanoparticles can be obtained. In other words, a starting material for the metal compound and a carbon material are introduced into the inner tube of the reactor of FIG. 9, and the inner tube is rotated to mix and disperse the starting material for the metal compound and the carbon material. A catalyst such as sodium hydroxide is further introduced while the inner tube is being rotated so that the hydrolysis and condensation reactions proceed to produce a metal compound, and the metal compound and the carbon material are mixed in a dispersed state. A carbon material supporting highly dispersed metal compound nanoparticle precursor can be formed with the end of the reaction.

The UC treatment when the metal compound is lithium titanate (hereinbelow LTO) is described in detail below. In the UC treatment, a metal alkoxide, which is the starting material for the metal oxide active material which is the metal compound, a lithium compound, and a reaction suppressor are added to the carbon material after the ultrahigh pressure dispersion treatment, and subjected to UC treatment which is a mechanochemical reaction. The metal alkoxide, the lithium compound, and the reaction suppressor will be described below.

(Metal Alkoxide)

The metal alkoxide used in the present embodiment is a metal alkoxide capable of occluding and releasing lithium. This metal alkoxide is preferably titanium alkoxide, and preferably those where the reaction rate constant of the metal alkoxide hydrolysis reaction is $10^{-5}$ mol$^{-1}$ sec$^{-1}$ or higher.

(Lithium Compound)

Lithium acetate ($CH_3COOLi$, Wako Pure Chemical Industries, Ltd., Special Grade) can be employed as the lithium compound. Examples of the lithium source other than lithium acetate that can be utilized are lithium hydroxide, lithium carbonate, and lithium nitrate. A lithium compound solution can be prepared by dissolving lithium acetate in a mixed solution of distilled water, acetic acid, and isopropyl alcohol.

(Reaction Suppressor)

When titanium alkoxide is employed as the metal alkoxide, there was a problem that lithium titanate may not be prepared because the reaction was too fast and titanium oxide was formed during preparing lithium titanate.

Accordingly, by adding a given compound that forms a complex with the titanium alkoxide as a reaction suppressor, the chemical reaction can be suppressed from being excessively promoted. Substances that can form a complex with titanium alkoxide include complexing agents represented by carboxylic acids such as acetic, citric, oxalic, formic, lactic, tartaric, fumaric, succinic, propionic, and levulinic acids, amino polycarboxylic acids such as EDTA, and aminoalcohols such as triethanolamine.

(Two-Step UC Treatment)

In the present embodiment, it is desirable to allow a highly dispersed metal compound precursor to be supported on a carbon material by a two-step UC treatment. First, as a first UC treatment, a carbon material, a metal alkoxide, and isopropyl alcohol are introduced into the inner tube of the reactor, and the inner tube is rotated to yield a mixed solution of evenly dispersed carbon material and metal alkoxide.

Further, as a second UC treatment, a mixed solution comprising a lithium compound, a reaction suppressor, and water is introduced while rotating the inner tube to thereby promote the chemical reaction between the metal alkoxide and the lithium compound, and a carbon material supporting highly dispersed metal compound precursor capable of occluding and releasing lithium is obtained with the end of the reaction.

This two-step UC treatment is regarded as separated into the first step of dispersion and adsorption and the second step of precursor production treatment. The dispersion and adsorption step is a step where the carbon material is nanosized, while one of the metal oxide precursor material sources such as a metal alkoxide is adsorbed onto the functional group of the carbon material. In the precursor production treatment step, using the material source adsorbed on the carbon material as the base point, a metal oxide precursor is produced on the carbon material.

Figure 10:
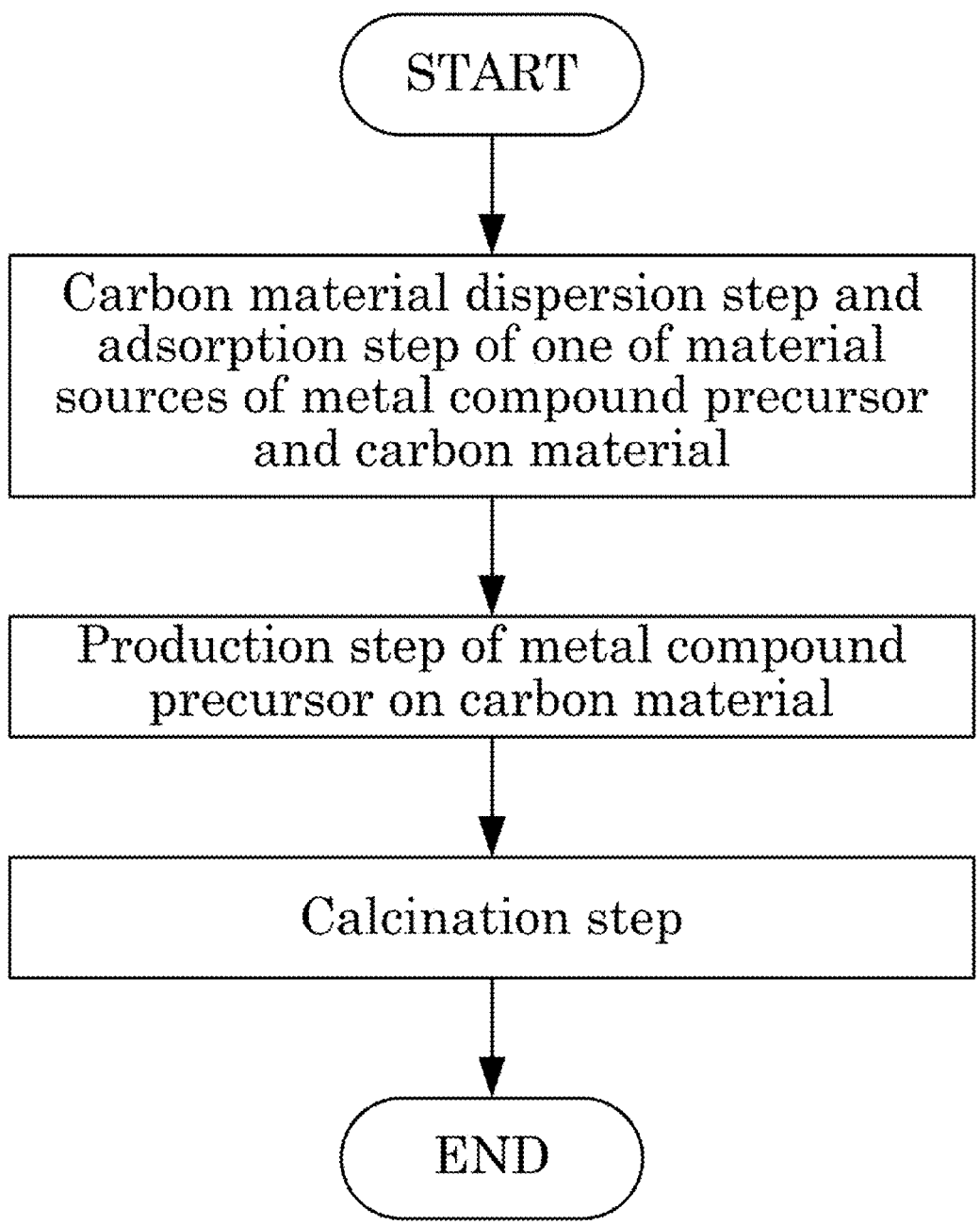
FIG. 10 is a flow chart showing the outline steps of the manufacturing method of the present embodiment.

In other words, in the manufacturing method of the present embodiment, as shown in FIG. 10, the precursor production step of producing the metal compound precursor is separated from the adsorption step of adsorbing the metal compound precursor material source onto the carbon material. It is thought that one metal source of the metal compound precursor is first adsorbed onto the carbon material, and then the metal compound precursor is produced on the carbon material.

Further, it is thought that since one material source of the metal compound precursor is adsorbed onto the carbon material before the precursor production treatment, the nanosized carbon material and the metal compound precursor maintain their nanoparticulate size in the compositing process without reaggregation.

Figure 11:
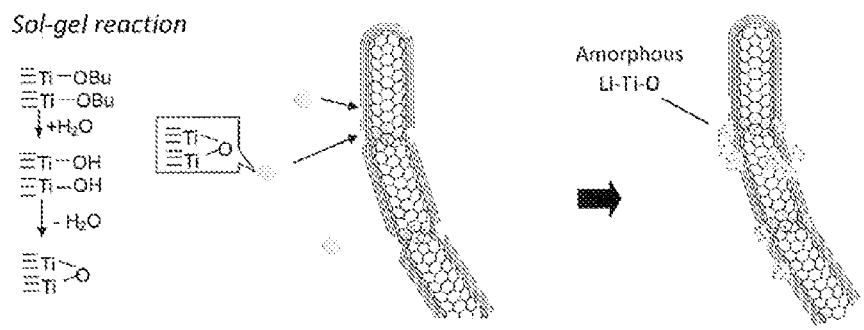
FIG. 11 is a schematic diagram showing the reaggregation of the metal compound precursor by the conventional one-time UC treatment.

Conventionally, the object was to simultaneously perform the nanosizing of a carbon material, the production of a metal compound precursor, the nanosizing of the metal compound precursor, and the adsorption of the metal compound precursor onto the carbon material. However, as shown in FIG. 11, it is thought that more than a little aggregation of the metal compound precursor had occurred before adsorption and metal compound precursors with relatively large size had been adsorbed onto the carbon material.

Figure 12:
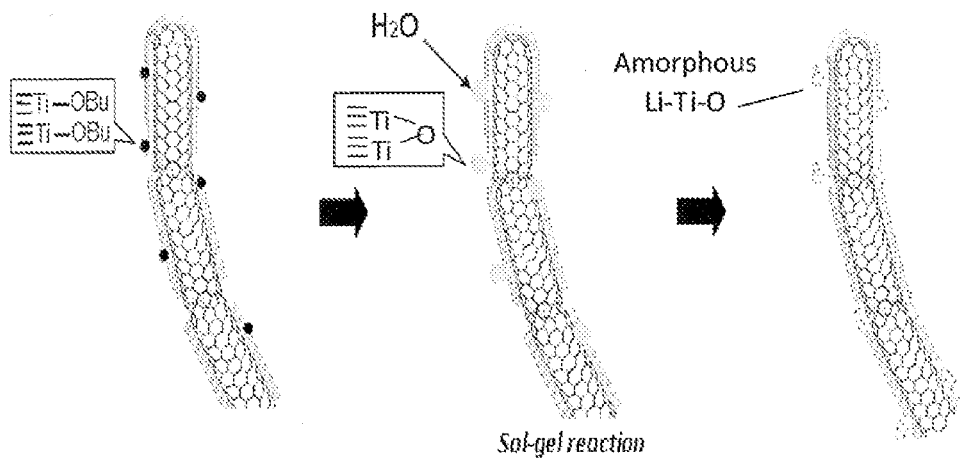
FIG. 12 is a schematic diagram showing the compositing with the carbon material and the production of a metal compound precursor by the two-step UC treatment of the present embodiment.

However, in the adsorption step which is the first UC treatment in the present embodiment, the mechanochemical reaction is occurring under a situation where it is difficult for a metal compound precursor to be produced. As shown in FIG. 12, in this mechanochemical reaction, many of the material sources of the metal compound which are subject to less aggregation compared to the metal compound precursor are adsorbed onto the carbon material still in their small size.

Accordingly, as shown in FIG. 12, in the precursor production step, it is thought that because the positions where the metal compound precursors are produced are dispersed on the carbon material and the adsorbed state thereof is retained, there is less tendency for aggregation even when the metal compound precursor is produced in the second UC treatment. Consequently, the composite material prepared by this manufacturing method maintains the nanosize of the metal compound precursor.

The two-step UC treatment will be described in detail below.

(i) Adsorption Step

A mixed solution of the carbon material and the metal compound precursor material source mixed in a solvent is prepared. The solvent employed is an alcohol such as IPA (isopropyl alcohol) or water. Then, a mechanochemical reaction by UC treatment is utilized for nanosizing the carbon material and adsorbing one metal compound precursor material source onto the carbon material. In order to perform the adsorption reaction before the nanosized carbon material reaggregates, it is preferred that the mixed solution of the carbon material and the metal compound precursor material source to be adsorbed thereon mixed in a solvent is subjected to UC treatment to simultaneously cause nanosizing and adsorption reaction.

Examples of main material sources that adsorb onto the carbon material by the mechanochemical reaction are a titanium source and phosphorus which is a phosphoric acid source, which are material sources having positively-charged ions that easily bond with oxygen ions having unpaired electrons present in the functional group.

In this adsorption step, it is desirable to avoid the production of the metal compound precursor as much as possible. This is because if the production of the metal compound precursor occurs before one of metal compound precursor material sources is adsorbed onto the carbon material, aggregation is caused before the metal compound precursor is adsorbed onto the carbon material. Accordingly, when the production of the metal compound precursor reaction is a hydrolysis reaction, it is preferable that the solvent is an alcohol instead of distilled water so that hydrolysis or dehydration polymerization of the material source will be reduced. In addition, when the production reaction of the metal compound precursor is a complex formation reaction, it is better to adjust the pH so that complex formation of the material source will be reduced.

(ii) Precursor Production Step

By carrying out the second UC treatment, the metal compound precursor material source adsorbed on the carbon material and other material sources are mechanochemically reacted to produce a metal compound precursor on the carbon material. When the production reaction of the metal compound precursor is a hydrolysis reaction, $H_2O$ (distilled water) for hydrolysis or dehydration polymerization is added. In addition, when the production reaction of the metal compound precursor is a complex formation reaction, pH is adjusted for complex formation. For pH adjustment, e.g. alkali such as ammonia is administered into the reaction container. In other words, the dispersion and adsorption step and the precursor production step can be separated by $H_2O$ (distilled water) or pH adjustment.

When the metal compound precursor material source is a metal alkoxide, hydrolysis and dehydration condensation reaction mainly occur on the carbon material and the metal compound precursor $MO_x(OH)_{x-1}$ is produced on the carbon material by this mechanochemical reaction. For example, when producing lithium titanate, the metal compound precursor, which is a polycondensation product consisting of titanium, oxygen, and hydrogen, is produced by the hydrolysis and dehydration polycondensation reaction of titanium alkoxide.

Moreover, when the metal compound precursor material sources are a metal salt and a carboxylic acid, a material source adsorbed on the carbon material and the other material source forms a complex. For example, when producing lithium iron phosphate, the adsorbed metal compound precursor material source is phosphoric acid, and this phosphoric acid, an Fe source, and citric acid form a complex to form a three-way complex which is the metal compound precursor.

In this precursor production step, the lithium source may be mixed before calcination since it is thought to be not involved in any major reactions. However, it is preferably mixed together in the precursor production step because the mixing treatment of the lithium source can be simultaneously carried out by the second UC treatment.

Accordingly, since the metal alkoxide which is one metal compound precursor material and the carbon material are dispersed before starting the chemical reaction with the metal compound capable of occluding and releasing lithium, the precursor of the metal compound will be evenly dispersed and supported on the carbon material, and thus aggregation of metal compound nanoparticles will be prevented and output property will be improved.

Further, the carbon material supporting a dispersed metal compound precursor capable of occluding and releasing lithium can also be produced by a one-step UC treatment. In such a case, a carbon material, a metal alkoxide, a reaction suppressor, and water are introduced into the inner tube of the reactor, and the inner tube is rotated to allow mixing and dispersion thereof, while at the same time hydrolysis and condensation reactions are allowed to proceed to promote chemical reaction. A carbon material supporting a dispersed metal compound precursor capable of occluding and releasing lithium can be obtained with the end of the reaction.

(Drying)

A mixed solution of the carbon material supporting highly dispersed metal compound precursor obtained by the UC treatment is dried in the range of 85° C.-100° C. This is preferred because it leads to suppression of aggregation of the metal compound precursor that is evenly dispersed and supported on the carbon material by the two-step UC treatment, thereby preventing aggregation of the metal compound, as well as improving the capacity and output property of electrodes and electrochemical elements that use the electrode material of the present embodiment.

(Calcination Treatment)

The dried carbon material supporting highly dispersed metal compound precursor is subjected to a two-step calcination of e.g. at 300° C. for 1 hour and at 900° C. for 4 minutes, thereby yielding a composite powder of highly dispersed metal compound nanoparticles supported on carbon material. Further, a short-duration calcination at a high temperature of 900° C. yields a metal compound of even composition. As a result, aggregation the metal compound is prevented, and a composite material of metal compound and carbon material which is crystalline nanoparticles with small particle size can be prepared.

(2) Sheeting Treatment of Composite Material

In the sheeting treatment, the composite material of metal compound and carbon material after the compositing treatment thereof and a binder which is a fibrous carbon are added to the solvent and stirred to produce a slurried mixed solution. As a result, even dispersion of the composite material and the fibrous carbon in the solvent, as well as microgrinding of the fibrous carbon are achieved. This mixed solution is molded in a paper machine, dried under reduced pressure, and made into a sheet.

In other words, as an example of a sheeting treatment:

(a) a fibrous carbon binder may be dispersed by ultrahigh pressure dispersion treatment (pretreatment);

(b) a mixed solution of a composite material added to the fibrous carbon dispersed by the ultrahigh pressure dispersion treatment may be stirred (stirring treatment); and (c) the stirred mixed solution may be molded in a paper machine, dried under reduced pressure, and made into a sheet to prepare a sheet composite (sheeting treatment).

(a) Pretreatment

The pretreatment of dispersing a fibrous carbon binder by ultrahigh pressure dispersion treatment is similar to the pretreatment (a) during the compositing treatment of the composite material described above. By this pretreatment, a fibrous carbon binder and IPA are mixed to produce a mixed solution, and ultrahigh pressure dispersion treatment is applied to this mixed solution to yield a mixed solution containing dispersed fibrous carbon binder.

(b) Stirring Treatment

To the mixed solution containing dispersed fibrous carbon binder after the pretreatment (a) during the sheeting treatment, the composite material after the compositing treatment of the composite material is added and stirred to produce a slurried mixed solution.

A homogenizer can be utilized for stirring the mixed solution. A homogenizer is a type of generator, consists of a drive unit, a fixed outer blade, and a rotating inner blade, and performs a line of homogenation via high-speed dispersion—microgrinding—uniformalization. As a result, even dispersion of the composite material and the fibrous carbon binder in the solvent, as well as microgrinding of the fibrous carbon binder are achieved.

(c) Sheeting Treatment

In the sheeting treatment, the mixed solution after the stirring treatment is molded in a paper machine and made into a sheet. When molding in a paper machine, the mixed solution is made into a sheet by filtering under reduced pressure with a PTFE filter paper (diameter: 35 mm, average pore size 0.2 μm). This sheet is dried under reduced pressure at 60° C. for 3 hours. A sheet composite of a composite material and a fibrous carbon can be formed by the treatment above. This sheet composite is subjected to a roller treatment such as pressing if necessary.

In a conventional composite electrode of a metal oxide active material and a fibrous carbon, an organic binder such as polyvinylidene fluoride (hereinbelow PVDF) was utilized as the binder for preparing the electrode. However, since an organic binder is an insulant, there was a problem that this becomes a factor for reducing the output property and energy density. Accordingly, there is an increasing expectation for an electrode that does not utilize an organic binder.

Consequently, it is contemplated to achieve output property and high energy density by molding a composite material of a metal compound capable of occluding and releasing lithium supported on a carbon material into a sheet-form in a paper machine with a fibrous carbon binder, without using an organic binder. According to this, a sheet composite prepared by adding a non-organic fibrous carbon binder to a composite material consisting of a metal compound capable of occluding and releasing lithium and a carbon material and molding in a paper machine shows high output property, high rate property that exerts high output at each rate, and high capacitance property.

(Electrode)

The sheet composite of the composite material and the fibrous carbon is cut into the same size as a collector of a metal foil such as an aluminum foil, placed on top of the collector, sandwiched with a separately prepared metal foil placed on top thereof, and pressed at a pressure of 10 t/cm$^2$ for 1 minute from above and under the metal foil to unify the collector with the sheet composite. A sheet composite unified with the collector as such can be made into an electrode of an electrochemical element, i.e. an electrical energy storage electrode, and this electrode shows high output property and high capacitance property.

A foil consisting of metal materials such as aluminum, copper, and platinum are employed as the collector, and an etched foil having dents and bumps formed by etching treatment or a plain foil having a flat surface is employed on the surface. The pressing pressure for unifying the collector with the sheet composite is preferably 0.01-100 t/cm$^2$, and by this pressing, the pressure is applied to the dents and bumps of the surface-expanded etched aluminum foil so that the bumps bite into the molded sheet composite or a portion of the sheet composite is pinched in the dents, and superior conjugation can be rendered.

(Electrochemical Element)

An electrochemical element that can employ this sheet composite and an electrode employing this sheet composite is an electrochemical capacitor or battery that employ an electrolytic solution containing ions of metals such as lithium or magnesium. In other words, the electrode of the present embodiment can occlude and desorb metal ions, and works as a negative or positive electrode. For example, an electrochemical capacitor or battery can be configured by laminating the electrode of the present embodiment with an electrode which will be the counter electrode such as an activated carbon, a carbon from which metal ions occlude and desorb, or a metal oxide (with a separator in between), and employing an electrolytic solution containing a metal ion.

EXAMPLES

First Property Comparison (Property Comparison by Presence or Absence of Binder)

In the first property comparison, the property comparison was made according to the presence or absence of a binder added to the composite material which is a fibrous carbon binder. Example 1 and Comparative Example 1 used in the first property comparison are as follows. In this property comparison, LTO is used as the metal compound, CNF is used as the carbon material, and CNT is used as the fibrous carbon added as the binder to this composite material.

Example 1

In Example 1, a mixed solution of CNF dispersed in IPA was produced by jet mixing, the mixed solution, titanium alkoxide, and IPA were introduced into the inner tube of the reactor for carrying out an UC treatment, a first UC treatment was performed, a lithium compound, a reaction suppressor, and water were further introduced, and a second UC treatment was performed to yield CNF supporting highly dispersed LTO precursor. This CNF supporting highly dispersed LTO precursor was dried at 90° C., and further calcinated in nitrogen atmosphere at 900° C. to yield a composite material of CNF supporting highly dispersed lithium titanate nanoparticles.

Next, a mixed solution of a CNT binder dispersed in IPA was produced by jet mixing, the composite material was added to this mixed solution and stirred to prepare a slurried mixed solvent, this was filtered under reduced pressure with a PTFE filter paper (diameter: 35 mm, average pore size 0.2 µm), and molded in a paper machine to yield a sheet. This sheet was then dried under reduced pressure at 60° C. for 3 hours to form a sheet composite.

Comparative Example 1

Comparative Example 1 was similar to Example 1, except that it did not employ a binder upon paper molding while Example 1 employs a CNT binder upon paper-molding to form a sheet composite.

Figure 1B:
Figure 2:
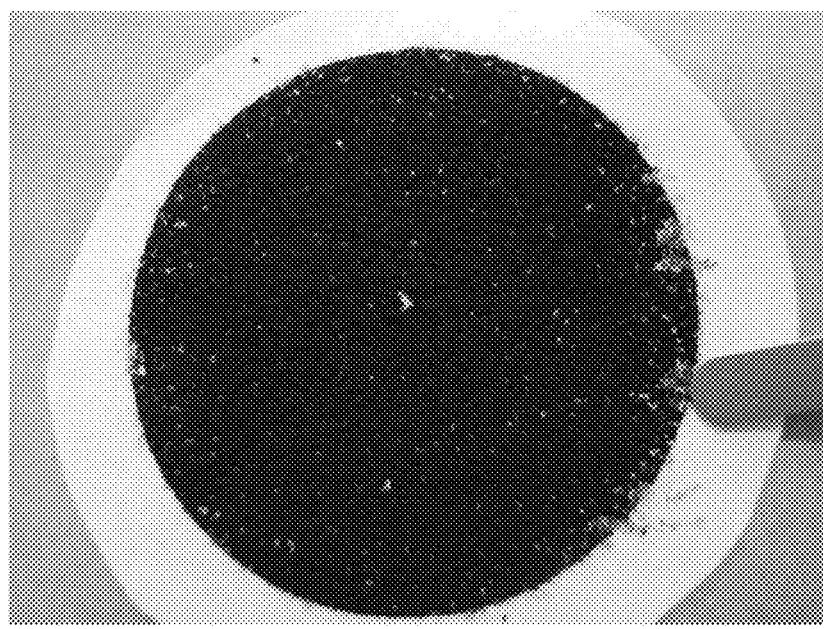
FIG. 2 is a photograph showing the state of the sheet of the Comparative Example in the first property comparison in the embodiments of the present invention.

A photograph representing the state of as such prepared sheet composite of Example 1 is shown in FIG. 1, and a photograph indicating the state of the sheet composite of Comparative Example 1 is shown in FIG. 2. FIG. 1A is a photograph showing the state of the sheet composite of Example 1, FIG. 1B is a SEM image of the backside of the sheet composite of Example 1. It is seen from FIG. 1A that due to the fibrous CNT acting as the binder on the particulate composite material, Example 1 with CNT added as the binder became a self-standing sheet. In addition, it is seen from FIG. 1B that the composite material particles are not exposed on the surface of the sheet composite because the particulate composite material is evenly placed in the self-standing sheet.

Meanwhile, FIG. 2 is a figure showing the state of the sheet composite of Comparative Example 1. It is seen from FIG. 2 that in Comparative Example 1 which did not use a fibrous carbon binder, there was merely an accumulation of a composite material of particulate LTO and CNF. It is seen that since LTO and CNF do not have e.g. adherence, attachment, and conjugation effects per se, the composite material thereof is not unified and a sheet is not formed.

Figure 3:
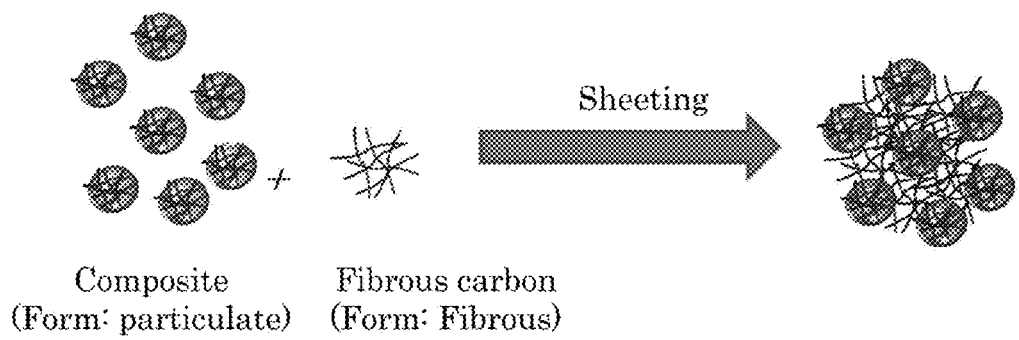
FIG. 3 is a schematic diagram showing the state of the sheet of the Example in the embodiments of the present invention.

In other words, as shown in the schematic diagram of FIG. 3 showing the state of the sheet of the Example, in a sheet composite utilizing CNT as the binder, the fibrous CNT binder is entwined and the carbon material supporting nanoparticulate LTO (composite material) is incorporated therebetween. As a result, a self-standing sheet with strength can be prepared. Moreover, a similar effect can also be realized with an electrode and an electrochemical element employing this sheet composite.

From the above, by adding a fibrous carbon as the binder to a composite material of metal compound and carbon material, a sheet composite as well as an electrode and an electrochemical element employing the sheet composite can be formed, wherein the composite material of the metal compound and the carbon material are evenly placed.

Second Property Comparison (Property Comparison by Type of Binder)

In the second property comparison, the property comparison was made according to the types of binder added to the composite material. Example 2 and Comparative Example 2 used in the second property comparison are as follows. In this property comparison, LTO is used as the metal compound, CNF is used as the carbon material, and CNT is used as the fibrous carbon added as the binder to the composite material.

Example 2

In Example 2, the sheet composite formed in Example 1 was treated with a roller, this sheet composite was pressed and unified with an etched aluminum foil to prepare an electrode, and an electrochemical cell was prepared by facing this against a lithium foil which will be the counter electrode via a separator and employing an electrolytic solution of 1 mole of $LiBF_4$ as the electrolyte added to 1 L of propylene carbonate (PC) solvent (1M $LiBF_4$/PC).

Comparative Example 2

In Comparative Example 2, a mixed aqueous solution of the composite material described in Example 1 mixed with an organic binder carboxymethylcellulose (CMC) as the binder was prepared, this mixed aqueous solution was applied on an etched aluminum foil, and the solvent (water) was removed to prepare a coated electrode having a coating layer formed on an aluminum foil surface. An electrochemical cell was prepared by facing this coated electrode against a lithium foil which will be the counter electrode via a separator and employing an electrolytic solution of 1 mole of $LiBF_4$ as the electrolyte added to 1 L of propylene carbonate (PC) solvent (1M $LiBF_4$/PC).

[Rate Property]

Charge and discharge measurement at an electrode potential of 1.0-3.0 V and a C rate of 100 C was performed on the cells of Example 2 and Comparative Example 2 prepared as such, and results as shown in Table 1 were obtained.

TABLE 1

|  | Electrode | Binder | Capacity Density/ $mAhg^{-1}$ |
| --- | --- | --- | --- |
| Comparative Example 2 | LTO/CNF | Organic binder | 60 |
| Example 2 | LTO/CNF | CNT binder | 78 |

As apparent from Table 1, it is seen that Example 2 will have a higher capacity density compared to Comparative Example 2. In other words, it is seen that an electrode employing a sheet composite with CNT added as the binder to a composite material of a metal compound and CNF will have a lager capacity per unit compared to a coated electrode utilizing an organic binder (CMC) as the binder.

From the above, by adding a fibrous carbon as the binder to a composite material of metal compound and carbon material, a sheet composite as well as an electrode and an electrochemical element employing the sheet composite showing property with high capacity per unit can be formed.

Third Property Comparison (Property Comparison by Added Amount of Binder)

In the third property comparison, the property comparison was made according to the amount of the fibrous carbon binder added to the composite material. Examples 3 to 6 and Comparative Example 3 used in the third property comparison are as follows. In this property comparison, LTO is used as the composite material, CNF is used as the carbon material, and CNT is used as the fibrous carbon added as the binder to the composite material.

Examples 3 to 6 and Comparative Example 3

Example 3 was prepared similarly to the sheet composite of Example 1. Here, the sheet composite was formulated so that the amount of the CNT binder added was 7 wt % of the composite material.

Example 4 was prepared similarly to the sheet composite of Example 1. Here, the sheet composite was formulated so that the amount of the CNT binder added was 14 wt % of the composite material.

Example 5 was prepared similarly to the sheet composite of Example 1. Here, the sheet composite was formulated so that the amount of the CNT binder added was 20 wt % of the composite material.

Example 6 was prepared similarly to the sheet composite of Example 1. Here, the sheet composite was formulated so that the amount of the CNT binder added was 200 wt % of the composite material.

In Comparative Example 3, similarly to Comparative Example 1, an attempt was made to prepare a sheet electrode that did not employ a binder when molding in a paper machine.

In these Examples 3 to 6 and Comparative Example 3, the amount of lithium titanate nanopowder and CNF were adjusted so that the ratio between lithium titanate and CNF will be 80:20.

[Self-Standing of Sheet]

The sheet composites of Examples 3 to 6 and Comparative Example 3 prepared as such were tested to see whether or not they are self-standing, and results as shown in Table 2 were obtained. In the Table 2, "X" "Y" and "Z" respectively show the state of the sheets prepared. "X" means an even and self-standing sheet without unevenness on the surface. "Y" means a self-standing sheet but with unevenness on the surface. "Z" means a state where unification did not occur and a sheet was not formed.

TABLE 2

|  | Amount added to composite (wt. %) | LTO:CNF (wt. ratio) | State of self-standing sheet CNT |
|---|---|---|---|
| Comparative Example 3 | 0 | 80:20 | Z |
| Example 3 | 7 | 80:20 | Y |
| Example 4 | 14 | 80:20 | X |
| Example 5 | 20 | 80:20 | X |
| Example 6 | 200 | 80:20 | X |

As apparent from Table 2, it is seen that the sheet is not unified and is not self-standing in Comparative Example 3. Observing the surface of the sheet of Example 3, unevenness can be seen on the surface. However, the sheet is self-standing albeit with unevenness. In the sheets of Examples 4 to 6, a composite material of particulate LTO and CNF becomes even by a fibrous CNT binder to form sheets without unevenness.

In particular, when preparing a proper sheet without unevenness, it is desirable that the amount of CNT added as the binder is 10 wt % or more of the composite material. Further, a more proper sheet can be prepared by having the amount of CNT at 14 wt % or more. In the meantime, when the sheet composite is made into an electrode, it is desirable that a large amount of LTO is added in order to improve the capacity density. Accordingly, it is desirable that the amount of CNT added as the binder is 50 wt % or less. For a higher capacity density, a sheet having high capacity density can be prepared by having the amount of CNT at 25 wt % or less.

From the above, by adding 7 wt % to 200 wt %, desirably 10 wt % to 50 wt %, and further desirably 14 wt % to 25 wt % of a fibrous carbon as the binder to a composite material of LTO as the metal compound and a carbon material, a sheet composite as well as an electrode and an electrochemical element employing the sheet composite having high capacity density wherein the composite material of LTO and the carbon material is evenly placed can be formed.

Fourth Property Comparison (Property Comparison by Type of Fibrous Carbon)

In the fourth property comparison, the rate property comparison was made according to the types of metal compound and carbon material. Examples 7 and 8 as well as Comparative Examples 4 and 5 used in the fourth property comparison are as follows.

Example 7

In Example 7, a composite material of lithium iron phosphate (hereinbelow LFP) and CNF was used as the composite material of metal compound and carbon material.

Example 8

In Example 8, a composite material of LFP and KB was used as the composite material of metal compound and carbon material.

Specifically, in Examples 7 and 8, CNF (Example 7) or KB (Example 8) was employed as the carbon material. This carbon material, phosphoric acid, and distilled water were then mixed, and this mixed solution was subjected to 5 minutes of ultrasonic treatment to allow preliminary dispersion of the carbon material and pre-adsorption with phosphoric acid. This preliminary dispersion should allow easier nanosizing of the carbon material in the next UC treatment step, and the pre-adsorption should allow many phosphoric acids to be adsorbed to the functional group of the carbon material.

A mixed solution of iron acetate (II), citric acid, lithium acetate, and distilled water was added to the mixed solution after the ultrasonic treatment, and UC treatment was performed at a rotation speed of 50 m/s for 5 minutes. A centrifugal force of 66000 N (kgms$^{-2}$) is applied in this UC treatment. This first UC treatment corresponds to the nanosizing of the carbon material and the adsorption treatment of phosphoric acid to the functional group on the carbon material.

Subsequently, the mixed solution inside the container was adjusted to pH=6 by adding ammonia, and UC treatment was performed at a rotation speed of 50 m/s for 5 minutes. This second UC treatment is equivalent to a treatment of forming a complex between the phosphoric acid adsorbed on the carbon material particles, iron acetate (II), and citric acid, and corresponds to a treatment of metal compound precursor production on carbon material particles.

The solution obtained was dried in vacuum at 80° C. for 17 hours, and then rapidly heated in a nitrogen atmosphere to 700° C. so that crystallization of lithium iron phosphate proceeds, and a composite material of nanoparticulate lithium iron phosphate supported on a carbon material was obtained.

Then, 20 wt % of CNT as the binder and IPA were added to these composite materials and stirred to prepare a mixed solution. This mixed solution was filtered under reduced pressure with a PTFE filter paper (diameter: 35 mm, average pore size 0.2 μm). Subsequently, the mixed solution filtered under reduced pressure was molded in a paper machine to yield a sheet composite having a thickness of 40 to 45 μm. The sheet composite formed was treated with a roller, and this sheet composite was pressed and unified with an etched aluminum foil to prepare an electrode. An electrochemical cell was prepared by facing this electrode against a lithium foil which will be the counter electrode via a separator and employing an electrolytic solution of 1 mole of LiBF$_4$ as the electrolyte added to 1 L of propylene carbonate (PC) solvent (1M LiBF$_4$/PC) as the electrolytic solution.

Comparative Example 4

In Comparative Example 4, a composite material of LFP and CNF was used as the composite material of metal compound and carbon material.

Comparative Example 5

In Comparative Example 5, a composite material of LFP and KB was used as the composite material of metal compound and carbon material.

5 wt % of PVDF which is an organic binder was mixed as the binder with these composite materials to prepare a mixed solution, and a coated electrode having a coating layer formed by this mixed solution on an aluminum foil surface was prepared. An electrochemical cell was prepared by facing this electrode against a lithium foil which will be the counter electrode via a separator and employing an electrolytic solution of 1 mole of LiBF$_4$ as the electrolyte added to 1 L of propylene carbonate (PC) solvent (1M LiBF$_4$/PC) as the electrolytic solution.

[Rate Property]

Figure 4:
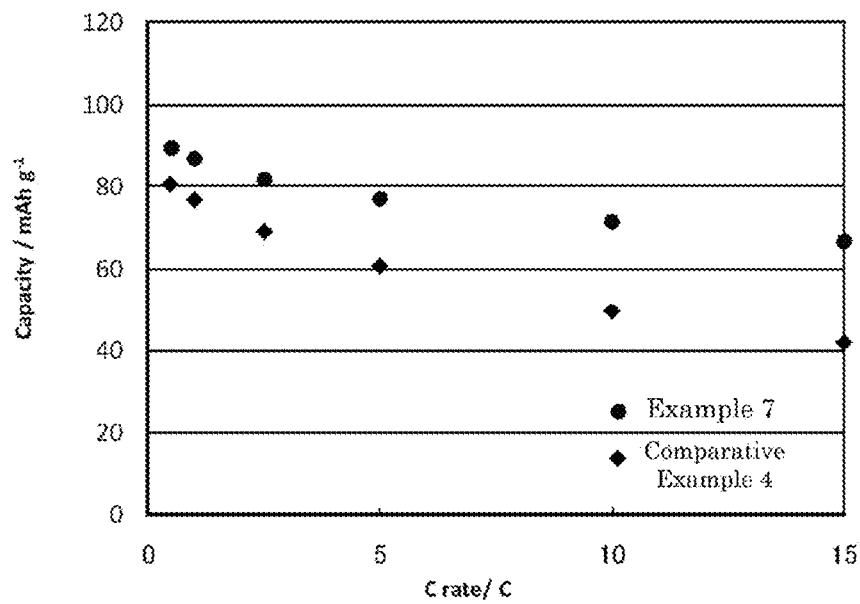
FIG. 4 is a graph showing the results of rate property evaluation of the fourth property comparison (LFP/CNF) in the embodiments of the present invention.
Figure 5:
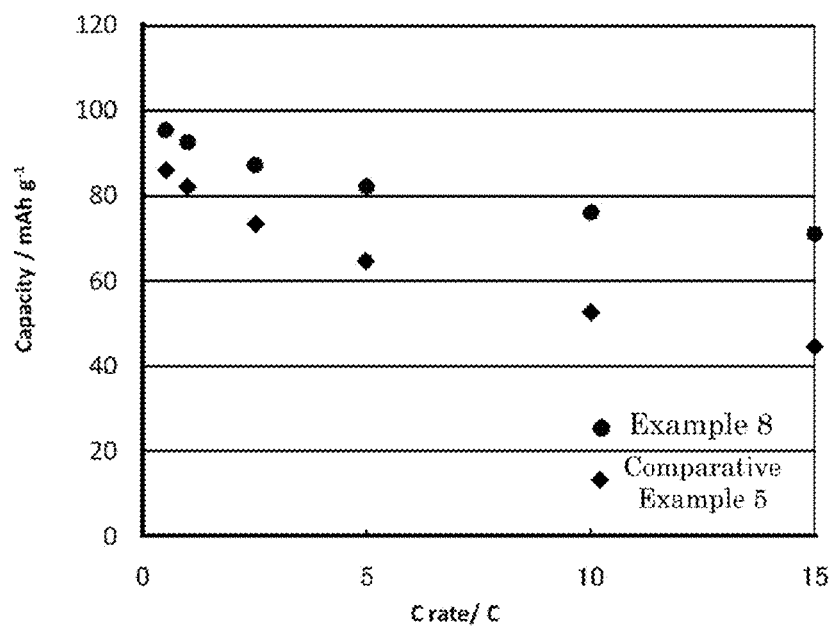
FIG. 5 is a graph showing the results of rate property evaluation of the fourth property comparison (LFP/KB) in the embodiments of the present invention.

Charge and discharge measurement was performed on the cells of Examples 7 and 8 as well as Comparative Examples 4 and 5 prepared as such, and results as shown in FIGS. 4 and 5 were obtained. FIG. 4 is a figure showing the rate property of an electrode using a composite material of LFP and CNF. FIG. 5 is a figure showing the rate property of an electrode using a composite material of LFP and KB.

From FIG. 4, it is seen that when LFP/CNF is used as the composite material, Example 7 having fibrous carbon added as the binder to the composite material shows a higher rate property compared Comparative Example 4 having an organic binder added as the binder.

From FIG. 5, it is also seen that when LFP/KB is used as the composite material, Example 8 having fibrous carbon added as the binder to the composite material shows a higher rate property compared Comparative Example 5 having an organic binder added as the binder.

From the above, a sheet composite as well as an electrode and an electrochemical element employing the composite having high rate property can be also be formed by adding a fibrous carbon as the binder to a composite material employing LFP as the metalized compound and employing CNF or KB as the carbon material.

Fifth Property Comparison (Property Comparison of Rate Property)

In the fifth property comparison, properties comparins was made according to the presence or absence of a binder added to the composite material. Examples 9 to 11 and Comparative Examples 6 to 8 used in the fifth property comparison are as follows. In this property comparison, LTO is used as the metal compound, CNF is used as the carbon material, and CNT is used as the fibrous carbon added as the binder to the composite material.

Examples 9 to 11

The thickness of the sheet composite formed in Example 2 was set in each of Examples 9 to 11 to prepare electrochemical cells. In Example 9, the thickness of the sheet composite molded in a paper machine was 23 μm. In Example 10, the thickness of the sheet composite molded in a paper machine was 50 μm. In Example 11, the thickness of the sheet composite molded in a paper machine was 71 μm.

Comparative Examples 6 to 8

The thickness of the coating layer of the coated electrode having CMC as the binder was each set similarly to Comparative Example 2 to prepare electrochemical cells. In Comparative Example 6, the thickness of the coating layer of the coated electrode was 23 μm. In Comparative Example 7, the thickness of the coating layer of the coated electrode was 50 μm. In Comparative Example 8, the thickness of the coating layer of the coated electrode was 71 μm.

[Rate Property]

Figure 6A:
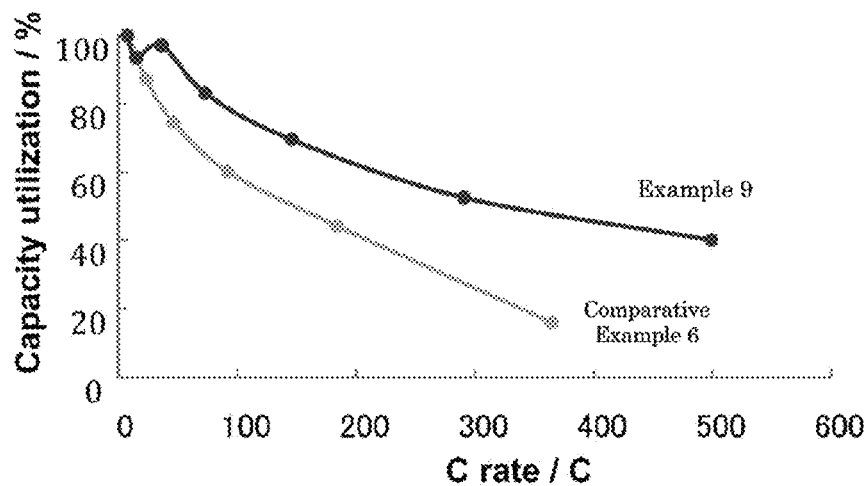
FIGS. 6A, 6B and 6C are graphs showing the result of charge and discharge measurement at the C rate range of the fifth property comparison in the embodiments of the present invention.
Figure 6B:
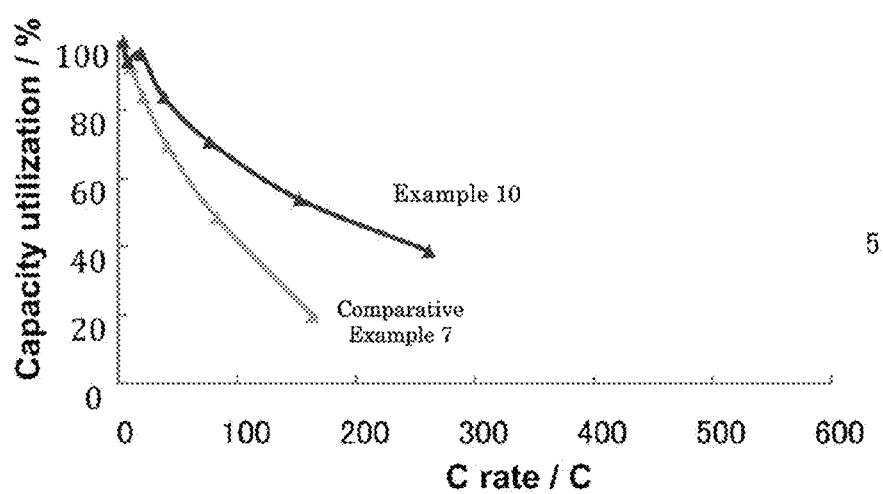
Figure 6C:
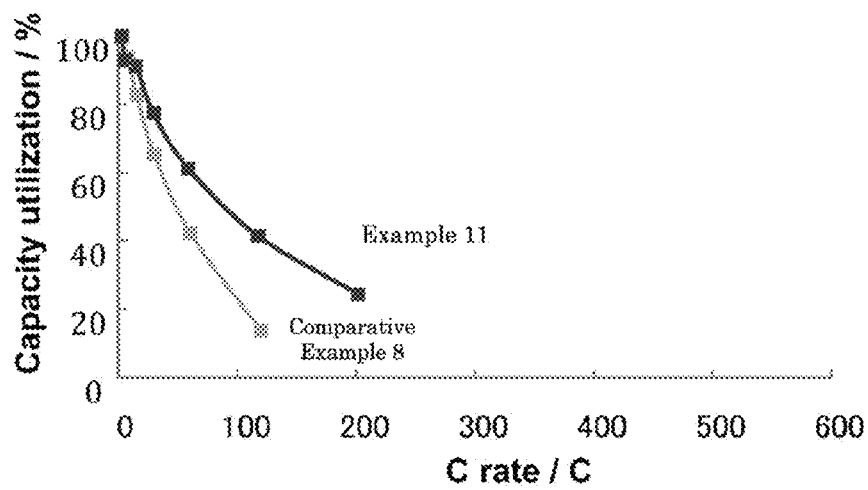

Charge and discharge measurement at an electrode potential of 1.0 to 3.0 V and a C rate range of 1 to 500 C was performed on the cells of Examples 9 to 11 and Comparative Examples 6 to 8 prepared as such, and results as shown in FIG. 6 were obtained. FIGS. 6A, 6B and 6C show the capacity utilization in the C rate range. FIG. 6A is a rate property comparison between Example 9 and Comparative Example 6, FIG. 6B is a rate property comparison between Example 10 and Comparative Example 7, and FIG. 6C is a rate property comparison between Example 11 and Comparative Example 8.

From FIGS. 6A, 6B and 6C, by comparing Comparative Examples 6 to 8 utilizing an organic binder as the binder with Examples 9 to 11 with CNT added as the binder, it is seen that when the thickness of the sheet composite and the thickness of the coating layer are the same, Examples 9 to 11 show higher evaluation in rate property.

From the above, by adding a fibrous carbon as the binder to a composite material of LTO as the metal compound and a carbon material, a sheet composite as well as an electrode and an electrochemical element employing the sheet composite having high rate property can be formed regardless of the thickness of the sheet composite.

Sixth Property Comparison (Property Comparison by Thickness of Sheet Composite)

In the sixth property comparison, the property comparison was made according to the thickness of the prepared sheet composites. Example 12 and Comparative Example 9 used in the sixth property comparison are as follows. In this property comparison, LTO is used as the metal compound, CNF is used as the carbon material, and CNT is used as the fibrous carbon added as the binder to the composite material.

Example 12

In Example 12, the thickness of the sheet composites formed in Example 4 were each set.

Comparative Example 9

In Comparative Example 9, the thickness of the coating layer of the coated electrode having CMC as the binder was each set similarly to Comparative Example 2.
[Rate Property]

Figure 7:
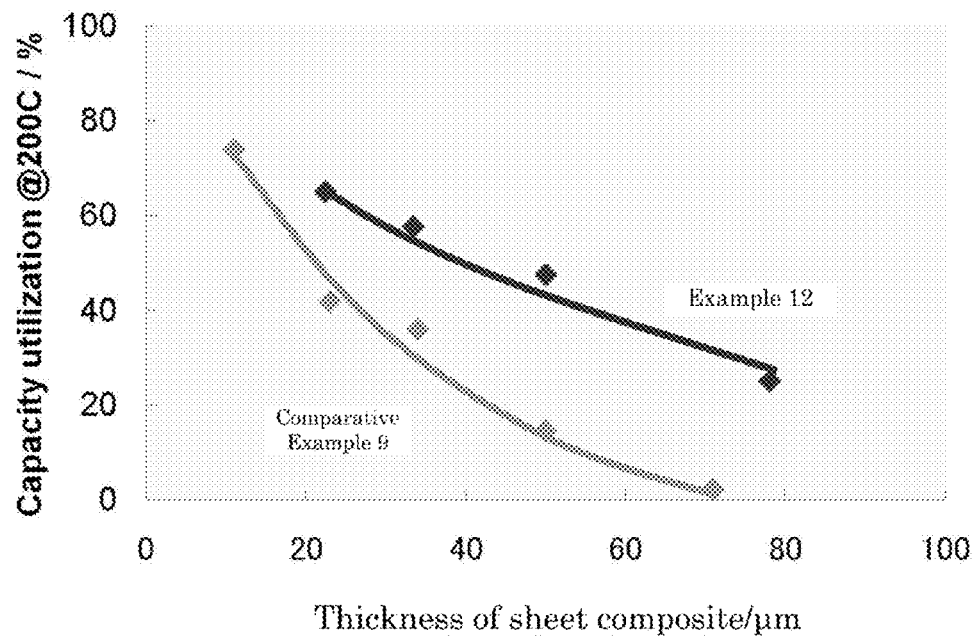
FIG. 7 is a graph showing the result of charge and discharge measurement at 200 C of the sixth property comparison in the embodiments of the present invention.

Charge and discharge measurement at an electrode potential of 1.0 to 3.0 V and a C rate of 200 C was performed on the cells of Example 12 and Comparative Example 9 prepared as such, and results as shown in FIG. 7 were obtained. FIG. 7 shows the capacity utilization vs. the thickness of the sheet composite and the coating layer. FIG. 7 is a rate property comparison between Example 12 and Comparative Example 9.

From FIG. 7, regarding charge and discharge measurement at 200 C, it is seen that by comparing Comparative Example 9 utilizing an organic binder as the binder with Example 12 with CNT added as the binder, Example 12 shows a higher evaluation in rate property.

In particular, when the thickness of the sheet composite is less than 20 μm, the effect of adding CNT as the binder will become less. On the other hand, when the thickness of the sheet composite is greater than 50 μm, the rate property will be reduced as shown in FIG. 7.

As described above, by adding a fibrous carbon as the binder to a composite material of LTO as the metal compound and a carbon material, a sheet composite as well as an electrode and an electrochemical element employing the sheet composite having high rate property can be formed regardless of the thickness of the sheet composite. Further, in light of the rate property, it is seen that the thickness of the sheet composite is desirably 20 μm to 50 μm.

Seventh Property Comparison (Property Comparison by Thickness of Sheet Composite at Each Rate)

Figure 8:
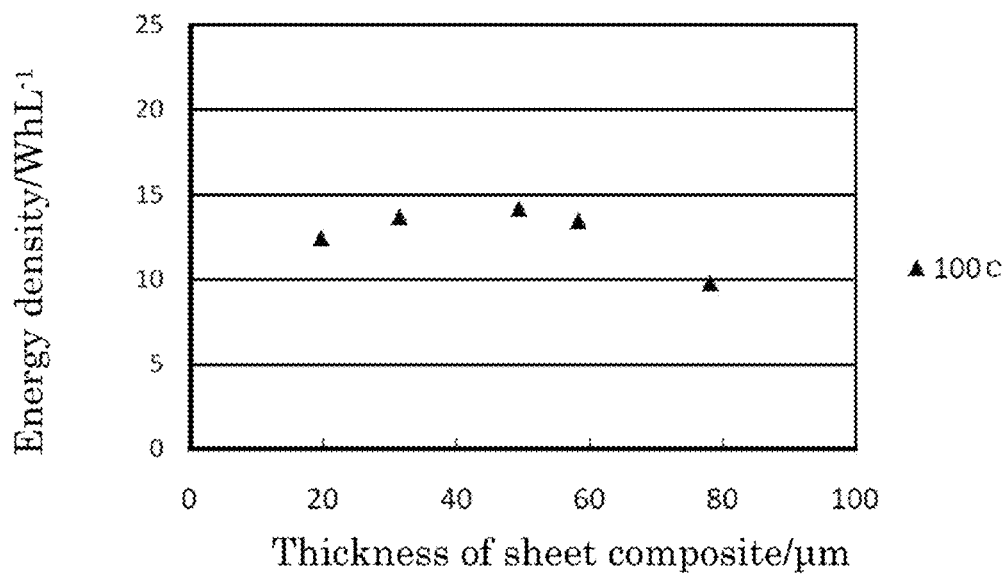
FIG. 8 is a graph showing the result of charge and discharge measurement at 100 C of the seventh property comparison in the embodiments of the present invention.

In the seventh property comparison, charge and discharge measurement at a C rate of 100 C was performed on the cell of Example 12. FIG. 8 shows the energy density vs. the thickness of the sheet composite.

From FIG. 8, regarding charge and discharge measurement at 100 C, it is seen that the energy density peaks when the thickness of the sheet composite is 50 μm. Moreover, it is seen that high energy density is also retained when the thickness of the sheet composite is 20 μm or 60 μm. The energy density will be decreased when the thickness of the sheet composite exceeds 60 μm and reaches to 80 μm. This is thought to be because when the thickness of the sheet composite becomes too large, resistance will be increased accordingly, and as a result energy density will be reduced. Consequently, it is preferred that the thickness of the sheet composite is 20 μm to 60 μm. Meanwhile, in light of the sixth property comparison (FIG. 7), since the rate property will be more improved as the thickness of sheet composite becomes thinner, it is most preferred that the thickness of sheet composite is 20 μm to 40 μm in light of this rate property and the energy density of FIG. 6.

As described above, by adding a fibrous carbon as the binder to a composite material of LTO as the metal compound and a carbon material, an electrochemical element employing a sheet composite having high rate property can be formed regardless of the thickness of the sheet composite. Further, regarding the charge and discharge measurement at 100 C, it is seen that high energy density is also retained when the thickness of sheet composite is 20 μm to 60 μm.

Eighth Property Comparison (Property Comparison by Separating UC treatment into Two Steps)

In the eighth property comparison, the property comparison was made according to the UC treatment separated into two steps. Examples 13 and 14 as well as Comparative Examples 10 and 11 used in the eighth property comparison are as follows.

Example 13

In Example 13, a mixed solution of CNF dispersed in IPA was produced by jet mixing, the mixed solution, titanium alkoxide, and IPA were introduced into the inner tube of the reactor for carrying out an UC treatment, a first UC treatment was performed, a lithium compound, a reaction suppressor, and water were further introduced, and a second UC treatment was performed to yield CNF supporting highly dispersed LTO precursor. This CNF supporting highly dispersed LTO precursor was dried at 90° C., and further calcinated in nitrogen atmosphere at 900° C. to yield a composite material of CNF supporting highly dispersed lithium titanate nanoparticles.

Next, a mixed solution of a CNT binder dispersed in IPA was produced by jet mixing, the composite material was added to this mixed solution and stirred to prepare a slurried mixed solvent, this was filtered under reduced pressure with a PTFE filter paper (diameter: 35 mm, average pore size 0.2 μm), and molded in a paper machine to yield a sheet. This sheet was then dried under reduced pressure at 60° C. for 3 hours to form a sheet composite.

Example 14

In Example 14, the two-step UC treatment was carried out at the same timing as Example 13, though, an organic binder carboxymethylcellulose (CMC) was employed as the binder in this Example.

Comparative Example 10

In Comparative Example 10, a CNT binder was employed for the paper-molding to form a sheet as with Example 13, but UC treatment was carried out only once in the preparation step of the composite material. In other words, with the objective to simultaneously perform the nanosizing of a carbon material, the production of a metal compound precursor, the nanosizing of the metal compound precursor, and the adsorption of the metal compound precursor onto the carbon material, a mixed solution of CNF, titanium alkoxide, IPA, a lithium compound, a reaction suppressor, and water was produced, and then this mixed solution was introduced into the inner tube of the reactor and subjected to UC treatment to yield CNF supporting LTO precursor.

Comparative Example 11

In Comparative Example 11, UC treatment was carried out only once in the preparation step of the composite material, and an organic binder carboxymethylcellulose (CMC) was employed as the binder. The remaining is the same as Example 13.
(Eighth Property Comparison Result)

The particle size of LTO agglomerates of the sheet composites obtained by the manufacturing method of Examples 13 and 14 and Comparative Examples 10 and 11 was measured by SEM observation. As a result, the particle size of LTO agglomerates was 5 nm to 20 nm in Examples 13 and 14 and 50 nm to 150 nm in Comparative Examples 10 and 11.

From this result, the LTO particle size was smaller in Examples 13 and 14 in which titanium alkoxide was adsorbed on CNF and a metal compound precursor was produced by allowing hydrolysis and polycondensation of titanium alkoxide on CFN, i.e. in which UC treatment was carried out in two separate steps.

Further, a battery employing the composite material powder prepared in Example 13 had a capacity of 106 mAh/g$^{-1}$ at a C rate of 1 C, and this was equivalent to 104 mAh/g$^{-1}$ from Comparative Example 10. A battery employing the composite material powder prepared in Example 14 had a capacity of 104 mAh/g$^{-1}$ at a C rate of 1 C, and this was equivalent to 102 mAh/g$^{-1}$ from Comparative Example 11.

However, a battery employing the composite material powder prepared in Example 13 had a capacity of 78 mAh/g$^{-1}$ at a C rate of 100 C compared to 65 mAh/g$^{-1}$ from Comparative Example 10, and it can be said that this achieves high capacity at a high C rate, in other words it has high input-output. In addition, a battery employing the composite material powder prepared in Example 14 had a capacity of 61 mAh/g$^{-1}$ at a C rate of 100 C compared to 50 mAh/g$^{-1}$ from Comparative Example 11, and it can be said that this also achieves high capacity at a high C rate and has high input-output.

It is thought that a good composite material was not obtained in Comparative Examples 10 and 11 because some aggregation had occurred during the time until titanium alkoxide is adsorbed onto CNF, causing that much increase in particle size and producing many functional groups that are not involved in adsorption due to the increase in particle size.

On the other hand, in the present embodiment exemplified by Examples 13 and 14, a metal compound precursor was supported on a carbon material by separating the treatment into a treatment of adsorbing one of the metal compound material sources to the functional group of the carbon material and a treatment of reacting the remaining material source of the adsorbed metal compound material source on the carbon material to produce a metal compound precursor on the carbon material, and then calcinating with a lithium source. As a result, the carbon material metal compound will remain nanosized until the end, and further higher input-output can be realized.

Ninth Property Comparison (Property Comparison by Altering Materials and Separating UC Treatment into Two Steps)

In the ninth property comparison, properties were compared in the same way as the eighth property comparison in that the UC treatment was separated into two steps, but the metal compound, the carbon material, or the binder were altered.

Example 15

In Example 15, a composite material of LFP and CNF was used as the composite material of metal compound and carbon material. The remaining is the same as Example 13, including the fact that UC treatment was separated into two steps.

Comparative Example 12

Comparative Example 12 is the same as Example 15 except that UC treatment was performed once.

Example 16

In Example 16, a composite material of LFP and KB was used as the composite material of metal compound and carbon material. The remaining is the same as Example 13, including the fact that UC treatment was separated into two steps.

Comparative Example 13

Comparative Example 13 is the same as Example 16 except that UC treatment was performed once.

Example 17

In Example 17, a composite material of LFP and CNF was used as the composite material of metal compound and carbon material, UC treatment was separated into two steps, and an organic binder PVDF was employed as the binder for the composite material. The remaining is the same as Example 13.

Comparative Example 14

Comparative Example 14 is the same as Example 17 except that UC treatment was performed once.

Example 18

In Example 18, a composite material of LFP and KB was used as the composite material of metal compound and carbon material, UC treatment was separated into two steps, and an organic binder PVDF was employed as the binder for the composite material. The remaining is the same as Example 13.

Comparative Example 15

Comparative Example 15 is the same as Example 18 except that UC treatment was performed once.

(Ninth Property Comparison Result)

The particle size of LTO agglomerates of the sheet composites obtained by the manufacturing method of Examples 15 to 18 and Comparative Examples 12 to 15 was measured by SEM observation. Moreover, the rate property of the batteries employing the composite material powder prepared in each of the Examples and Comparative Examples at 1 C and 15 C was also measured. The results are shown in Table 3 below.

TABLE 3

| | Electrode | UC/No. of times | Capacity density/mAhg$^{-1}$ 1 C | 15 C | Particle size/nm |
|---|---|---|---|---|---|
| Example 15 | LFP/CNF + CNT | 2 | 86.7 | 67.5 | |
| Example 16 | LFP/KB + CNT | 2 | 92.5 | 69.2 | 150-200 |
| Example 17 | LFP/CNF | 2 | 76.7 | 41.7 | |
| Example 18 | LFP/KB | 2 | 81.7 | 45 | 150-200 |
| Comparative Example 12 | LFP/CNF + CNT | 1 | 72.1 | 51.9 | |
| Comparative Example 13 | LFP/KB + CNT | 1 | 77 | 53 | 250-350 |
| Comparative Example 14 | LFP/CNF | 1 | 63.8 | 31.9 | |
| Comparative Example 15 | LFP/KB | 1 | 67.5 | 34.5 | 250-350 |

As is seen from this result, even when the metal compound, the carbon material, or the binder were altered, by comparing the case of dividing the UC treatment into two steps and the case of carrying it out only once, the particle size of the metal compound became smaller when the UC treatment was separated into two steps. Accordingly, when the C rate is 15 C, batteries employing the composite material powder prepared in each Example achieve higher capacity compared to the corresponding Comparative Examples, and it can be said to have high input-output as expected. Further, when LFP is employed as the metal compound, a higher capacity is achieved compared to the corresponding Comparative Example even when the C rate of the battery is 1 C.

As shown in the eighth and ninth property comparisons above, in the present embodiment exemplified by Examples 13 to 18, a metal compound precursor was supported on a carbon material by separating the treatment into a treatment of adsorbing one of the metal compound material sources to the functional group of the carbon material and a treatment of reacting the remaining material source of the adsorbed metal compound material source on the carbon material to produce a metal compound precursor on the carbon material, and then calcinating with a lithium source. As a result, the carbon material metal compound will remain nanosized until the end, and further higher input-output can be realized. Moreover, particularly high capacity can also be achieved when the metal compound is LFP.

1 . . . Outer tube
1-2 . . . Sheathing board
1-3 . . . Inner wall
2 . . . Inner tube
2-1 . . . Through-holes

The invention claimed is:

1. A method for manufacturing an electrode material including a composite material of a metal compound which occludes and releases lithium supported on a carbon material, comprising:

a first mechanochemical treatment of dispersing a starting material for a metal compound which occludes and releases lithium and a carbon material by applying shear stress and centrifugal force in a rotating reactor, a second mechanochemical treatment of further applying shear stress and centrifugal force in the reactor after the first mechanochemical treatment to allow production of a metal compound precursor of the metal compound which occludes and releases lithium from the starting material, and a calcination treatment of heating a mixture obtained by the second mechanochemical treatment, wherein one of a hydrolysis reaction and a complex formation reaction is used for producing the metal compound precursor, wherein when a hydrolysis reaction is used for producing the metal compound precursor, an alcohol is used as a solvent in the first mechanochemical treatment, and water is added in the second mechanochemical treatment, and wherein when a complex formation reaction is used for producing the metal compound precursor, a pH adjustment treatment is added between the first and the second mechanochemical treatments.

2. A method for manufacturing an electrode material according to claim 1, wherein the first mechanochemical treatment includes adsorbing one of the starting materials of the metal compound onto the carbon material, and the second mechanochemical treatment includes reacting the remaining starting materials of the adsorbed starting materials of the metal compound on the carbon material to produce the metal compound precursor on the carbon material.

3. A method for manufacturing an electrode material according to claim 1, wherein the electrode material is a sheet composite of the composite material molded in a paper machine using a fibrous carbon binder, and the fibrous carbon binder of the composite material comprises any of carbon nanotubes, carbon nanofibers, and carbon fibers having a specific surface area of less than 600 m$^2$/g.

4. A method for manufacturing an electrode material according to claim 2, wherein the complex formation reaction is used for producing the metal compound precursor.

5. A method for manufacturing an electrode material according to claim 2, wherein the electrode material is a sheet composite of the composite material molded in a paper machine using a fibrous carbon binder, and the fibrous carbon binder of the composite material comprises any of carbon nanotubes, carbon nanofibers, and carbon fibers having a specific surface area of less than 600 m$^2$/g.

6. A method for manufacturing an electrode material according to claim 4, wherein the electrode material is a sheet composite of the composite material molded in a paper machine using a fibrous carbon binder, and the fibrous carbon binder of the composite material comprises any of carbon nanotubes, carbon nanofibers, and carbon fibers having a specific surface area of less than 600 m$^2$/g.

7. The method of claim 1, wherein the hydrolysis reaction is used for producing the metal compound precursor.

* * * * *